United States Patent
Merkle

[11] 3,884,255
[45] May 20, 1975

[54] DUAL TANK FUEL SYSTEM

[75] Inventor: Ralph H. Merkle, Brighton, Mich.

[73] Assignee: General Motors Corporation, Detroit, Mich.

[22] Filed: Apr. 30, 1973

[21] Appl. No.: 355,578

[52] U.S. Cl. ............... 137/265; 137/266; 137/565; 220/85 VS; 280/5 A
[51] Int. Cl. .......................................... B60r 27/00
[58] Field of Search ........... 137/171, 255, 265, 266, 137/351, 354, 43, 587, 565; 280/5 A, 5 H; 220/85 VS

[56] References Cited
UNITED STATES PATENTS

| 933,484 | 9/1909 | Morris | 137/265 |
|---|---|---|---|
| 2,193,696 | 3/1940 | Ramsaur | 137/262 X |
| 2,808,892 | 10/1957 | Walker | 280/5 A X |
| 2,840,147 | 6/1958 | Almestad | 137/265 X |
| 2,867,395 | 1/1959 | Saint | 280/5 A UX |
| 3,006,358 | 10/1961 | Hildebrandt et al. | 280/5 A X |
| 3,548,847 | 12/1970 | Roven | 137/202 X |
| 3,610,220 | 10/1971 | Yamada | 280/5 A X |
| 3,698,160 | 10/1972 | Hunter | 137/43 X |
| 3,753,443 | 8/1973 | Sorimachi et al. | 137/255 |
| 3,768,498 | 10/1973 | Urban | 137/202 X |

FOREIGN PATENTS OR APPLICATIONS

| 968,647 | 9/1964 | United Kingdom | 280/5 A |
|---|---|---|---|
| 883,406 | 7/1953 | Germany | 280/5 A |

Primary Examiner—Alan Cohan
Assistant Examiner—Gerald A. Michalsky
Attorney, Agent, or Firm—J. C. Evans

[57] ABSTRACT

A vehicle fuel system including a main fuel tank and an auxiliary fuel tank each of which are supplied form a single fuel filler neck and filler pipe having a crossover portion between branch portions, each connected to a fuel opening located on the horizontal centerline of each tank. A suction line in each tank communicates with a solenoid operated fuel selector valve that selectively connects each of the suction lines to a fuel pump. Fuel is drawn from the main suction line and the fill pipe crossover to equalize fuel level in each of the tanks and to automatically maintain a fuel reserve in the auxiliary tank at a minimum fuel level. A suction line to auxiliary power systems on the vehicle is connected to the main tank and a vent system is connected to the pair of tanks to maintain the tanks vented upon fore and aft tilting movement thereof from the horizontal centerline with the crossover portion of the fill pipe serving to maintain each of the tanks connected to a vented space irrespective of the tilt attitudes of the tanks.

5 Claims, 4 Drawing Figures

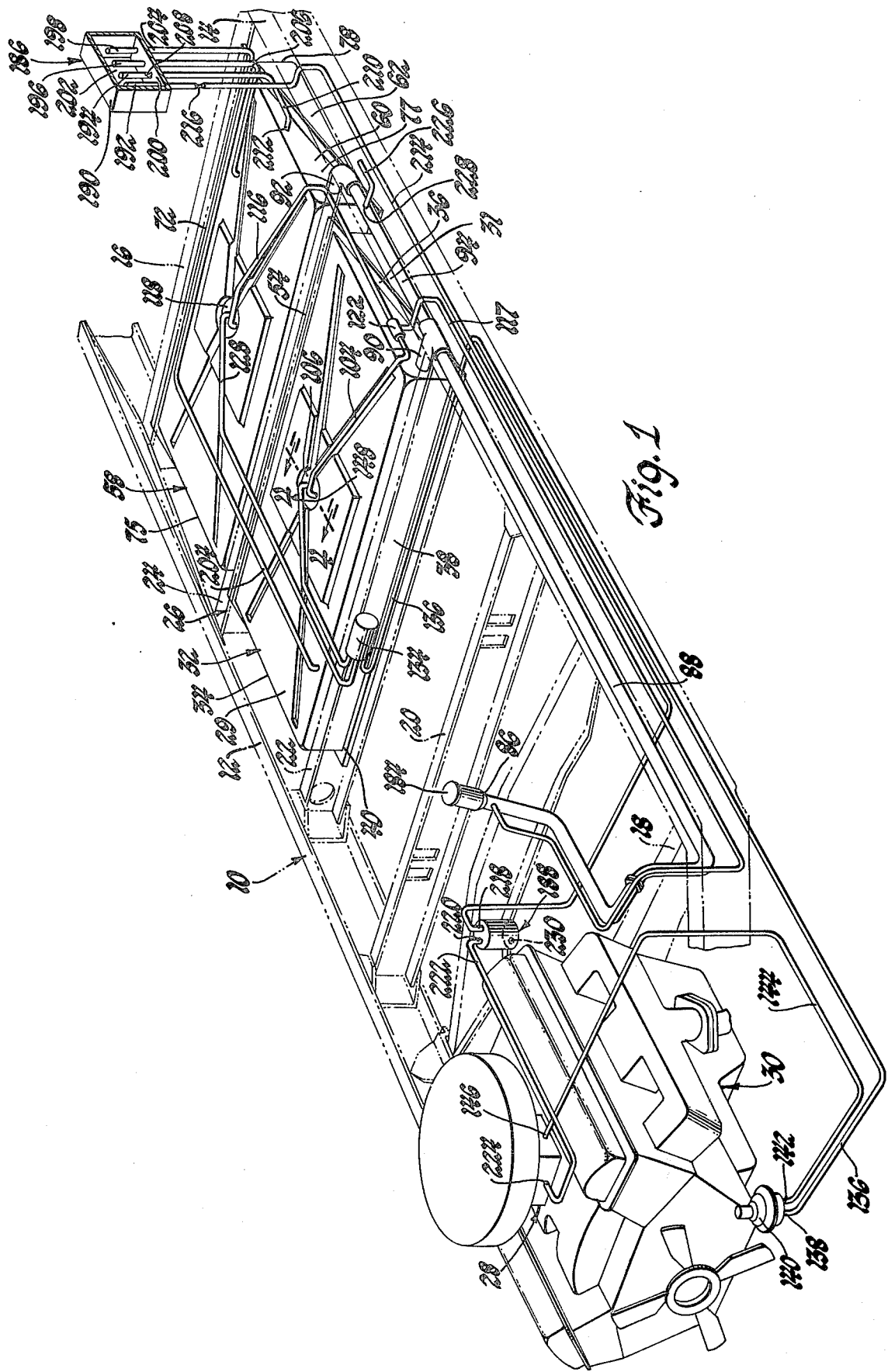

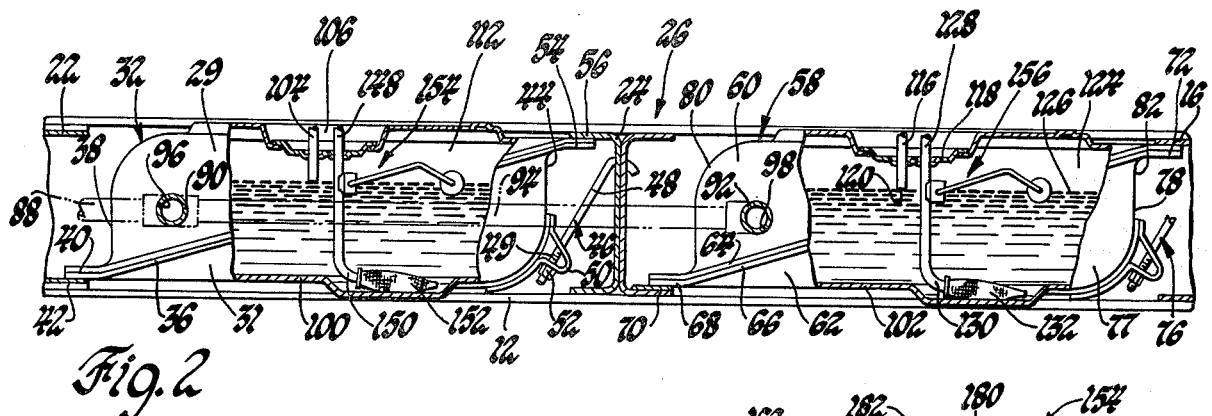
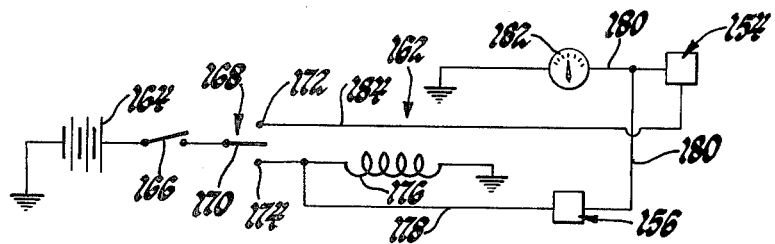
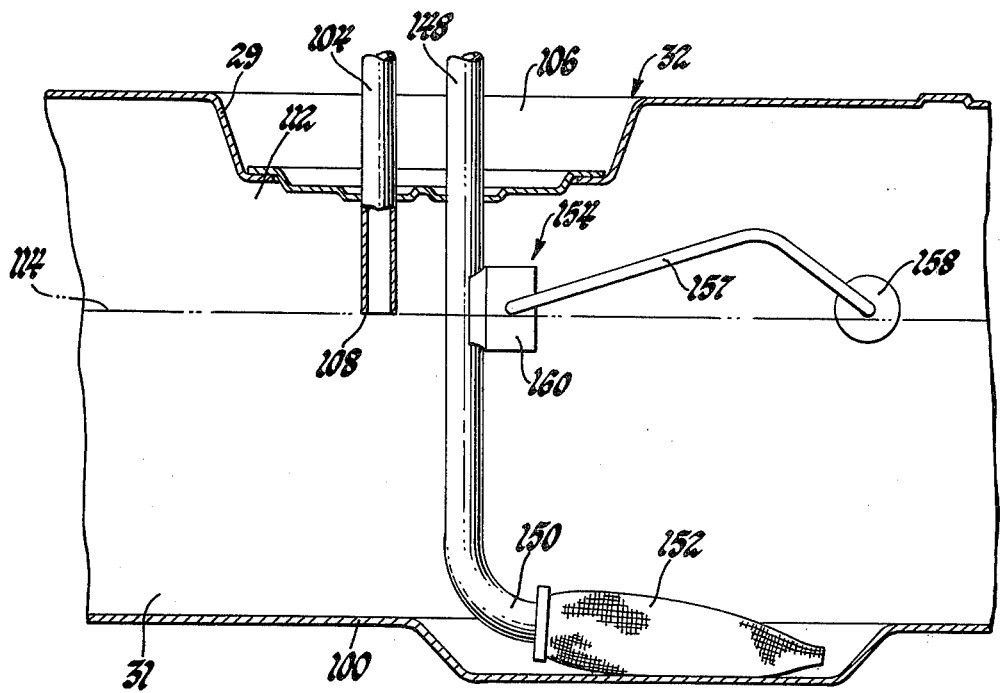

DUAL TANK FUEL SYSTEM

This invention relates to vehicle fuel supply systems and more particularly to fuel systems including a plurality of tanks including a reserve fuel supply and means for venting a plurality of tanks when tilted into different positions.

The use of reserve fuel tanks in vehicle supply systems is well known. In such tanks, various arrangements are provided to retain a predetermined quantity of reserve fuel within a single tank or in a separate auxiliary tank. In such systems, fuel is withdrawn from the main supply until it is emptied. Thereafter, the reserve fuel supply is connected to the vehicle fuel system to enable the vehicle to be driven to a filling station.

Such systems are especially useful in recreational and other vehicle types that require a fuel supply for the vehicle engine and a fuel supply for auxiliary power systems such as a gasoline engine driven generator for supplying electricity to the vehicle.

In such systems, the auxiliary power supply can consume substantial amounts of fuel during periods when the vehicle is parked at a camp site. Most recreational vehicles are characterized by the provision of a vehicle chassis that has limited space to accommodate fuel tanks. In such vehicles, the tank is configured to have a reduced vertical height to fit within the confines of the chassis frame without occupying any substantial portion of the space within the vehicle chassis itself.

It is desirable that the fuel volume in the vehicle tank be available for supply to the vehicle engine as well as for supply to auxiliary power units.

Previous auxiliary supply systems include those which have a separate compartment within a single tank to define a reserve fuel supply and those that include a separate tank for providing a reserve fuel supply. Such systems do not make use of the greatest part of the total fuel supply for both the auxiliary power system and for vehicle engine operation.

An object of the present invention is to provide an improved dual tank fuel system configured to fit within the confines of a vehicle frame without encroaching upon the space within the vehicle chassis and wherein most of the fuel volume within both of the dual tanks is available to supply fuel to both the vehicle engine and to an auxiliary power source and wherein means are included to selectively retain a predetermined amount of reserve fuel within one of the tanks following a predetermined period of auxiliary power operation wherein fuel is concurrently withdrawn from both of the tanks to supply the auxiliary power system.

Another object of the present invention is to provide an improved dual tank fuel supply system having a single fill pipe for supplying fuel to both of the tanks including a crossover portion connecting side openings in each of the tanks and wherein a fuel suction line is connected in one of the tanks for withdrawing fuel from the one tank and from the other tank through the crossover passageway until the fuel level in both tanks is below the bottom edge of the side openings in the tanks whereby the crossover automatically cuts off the other tank to retain a predetermined reserve fuel supply therein equal to the fuel volume between the bottom of the tank and the lower edge of the side opening therein, the system further including means for selectively withdrawing the reserve supply of fuel from the other tank once the main tank is empty.

Still another object of the present invention is to improve the fuel supply in a vehicle of the type having a drive engine and an auxiliary power supply thereon operated by a gasoline engine by the provision of a main tank and an auxiliary tank each supplied by a single fuel pipe having a crossover portion therein in communication with both tanks for equalizing the level of fuel in each of the tanks; and wherein a fuel suction line is connected in each of the tanks for directing fuel therefrom through a solenoid operated fuel selector valve which communicates the fuel pump of the vehicle engine with one of the suction lines and wherein the system includes a first pump-down phase where fuel is drawn from one of the suction lines and from both of the tanks through the crossover portion of the single fill pipe until the liquid level in both tanks is below a predetermined point at which the crossover portion no longer communicates both tanks thereby to automatically maintain a reserve fuel supply which is available by conditioning the selector valve means to draw fuel from the suction line in the other of the tanks.

Yet another object of the present invention is to provide an improved vent system for a pair of rectangular fuel tanks mounted fore and aft of one another and having a reduced vertical height wherein a crossover portion of a common fill pipe is used in conjunction with a first vent line connected on the top surface forwardly and to one side of one of the tanks and a second vent line connected rearwardly and to the opposite side of the top surface of the other of the tanks to maintain both of the tanks continually vented irrespective of tilting movements of the tanks in both the fore and aft direction from the horizontal.

These and other objects of the present invention are attained in one working embodiment of a dual tank system used on a recreational vehicle of the type having a flat vehicle frame with side frame members underlying a vehicle chassis that serves as a motor home. In such cases, it is desirable that the fuel supply of the vehicle not encroach upon the space occupied by the vehicle chassis itself. Accordingly, the fuel system includes a pair of rectangular fuel tanks that fit between the sides of the vehicle frame within the vertical height of the frame in a side-by-side relationship, one tank being forward of the other within the frame.

Fuel is supplied to the two fuel tanks through a single fuel filler neck and a fuel pipe connected to each of the tanks at side openings therein located on the centerline thereof. Each of the fuel openings in the tank are interconnected by a crossover portion of the fill pipe so as to maintain equal fuel levels therein until the fuel level within the tanks falls below the crossover portion of the pipe.

The system includes a suction line in each of the tanks that fluidly connects to a solenoid operated selector valve which will selectively connect one or the other of the suction lines within the tank to a fuel pump for supplying the carburetor system of the vehicle engine. Fuel is drawn from both tanks until the level is below the crossover. Then a reserve fuel supply is held in one tank while the other is emptied.

Additionally, a suction line is connected to the rearmost tank for supplying fuel to auxiliary power systems.

Each of the tanks has a domed top defining a vapor space for fuel expansion within the tank. To prevent the system from being overfilled, a fuel fill limiter line is connected to the center of each of said tanks having an opened end within the tank and being interconnected to a limiter line that enters the single fuel filler neck at the top thereof.

When the fuel level in the tank reaches the bottom end of the limiter lines, vapor is trapped within the upper volume of the tanks and fuel will backup in the fuel fill opening to indicate that the tanks have reached their maximum capacity.

Fore and aft tilting movements of the pair of tanks might block the fill limiter lines. Accordingly, the fuel system includes a first vent line connected to the upper front side surface of the forward tank and a second vent line connected to the rearward upper surface of the rear tank on its opposite side.

When the tank is tilted either fore or aft, one of the vent lines remains open and fuel expansion in the tank in which air is trapped, is free to expand through the crossover portion into the vented tank thereby to maintain both tanks continually vented irrespective of the attitude of the vehicle frame with respect to a horizontal plane.

The emission control of the vehicle includes a nonvented, pressure vacuum relief filler cap on the single fill opening, a liquid vapor separator and dual charcoal cannisters mounted in series. There is a constant purge from the charcoal cannister to the carburetor and shielding the exhaust pipe and the fuel tanks to reduce the fuel expansion and vapor emissions.

The liquid vapor separator is a rectangularly shaped container having four tubes extending above the bottom of the container. All the tubes have an open end within the container located adjacent the top thereof. The vent lines are connected to the tubes for directing vapor into the separator when the vent line is opened and for passing liquid into the container when the tanks are tilted in the manner to cause liquid fuel to flow through the vent lines. Liquid flow into the separator is returned to the tanks through a notched opening in the base of one of the tubes. This prevents liquid fuel from entering the emission system and flowing to the charcoal cannisters. The last tube in the container directs vapor from the upper portion thereof through a vent transfer line to the charcoal cannisters.

Each of the tanks has a float type sending unit for selectively indicating the fuel level in each of the tanks at a dash-mounted fuel meter under the control of a selector switch that also operates the fuel selector valve to connect the fuel pump of the engine to one of the tanks during a first pump-down phase wherein fuel is drawn from the rear tank and through the crossover from the forward tank until the level of the fuel falls below the crossover portion of the fill pipe.

Following reduction of the fuel level below the level of the crossover portion of the fill pipe, fuel is emptied only from the rearward tank retaining a reserve fuel supply in the forward tank. Once the rear tank is emptied, either through the suction line to the engine or through the suction line to the auxiliary fuel supply, the selector switch can be positioned to condition the solenoid operated valve to communicate only the suction line in the forward tank with the engine fuel pump thereby to supply the reserve fuel to the vehicle engine to enable it to be driven to a filling station.

Further objects and advantages of the present invention will be apparent from the following description, reference being had to the accompanying drawings wherein a preferred embodiment of the present invention is clearly shown.

IN THE DRAWINGS

FIG. 1 is a fragmentary view in perspective of the bottom frame of the vehicle, including the dual tank fuel supply system of the present invention;

FIG. 2 is a fragmentary side elevational view, partially sectioned, of two tanks in the fuel system;

FIG. 3 is a diagrammatic view of an electric circuit for controlling the operation of the illustrated fuel system; and FIG. 4 is an enlarged vertical sectional view taken along the line 4—4 of FIG. 1.

Referring now to the drawings, in FIG. 1 a vehicle frame assembly 10 is illustrated including two side rail members 12, 14 located in spaced parallelism and extending longitudinally of the frame assembly 10.

The side rail members are interconnected at the rear end by a cross frame member 16. A forward cross frame member 18 joins the opposite ends of the side rail members 12, 14. Additional reinforcing of the frame assembly is provided by a cross frame member 20 which is located between the front cross frame 18 and a mid-section cross frame member 22. Another cross frame member 24 in the vehicle assembly 10 is located between members 16, 22. The frame is representative of a typical vehicle frame for supporting a vehicle chassis serving as a mobile home, truck, or other recreational type vehicle.

In such vehicles, it is desirable to maximize the space within the vehicle chassis for living, cargo or other uses. Accordingly, it is desirable to locate the fuel supply system for the vehicle exteriorly of the chassis frame space. In accordance with certain principles of the present invention, a high capacity, dual tank fuel system 26 is supported by the vehicle frame assembly 10. It serves as a fuel supply for a carburetor system 28 of a vehicle engine 30, which is mounted in a conventional manner on frame extensions (not shown).

The fuel supply system 26 more particularly includes a forwardly located, auxiliary fuel tank 32 which is rectangular in shape and configured to fit within the confines of the frame assembly 10. It includes a flanged top 29 and a flanged bottom 31 joined together along their peripheries. More particularly, the auxiliary fuel tank 32 has a side-to-side dimension that is substantially equal to the distance between the inner surface of the side rail members 12, 14 thereby to locate side surfaces 34, 36 on tank 32 in close, spaced relationship to the side rail members 12, 14. The forward wall 38 of the fuel tank 32 has a flanged extension 40 thereon supportingly received by a flange 42 on the cross member 22. The rear wall 44 of the auxiliary tank 32 is located closely adjacent the forward surface of the cross member 24 where it is held in place by a pair of spaced apart clamp assemblies 46 one on either side of the tank surface 44. Each assembly 46 has a hook 48 fastened through the cross member 24. Hook 48 has a threaded end 49 directed through a tank bracket 50 to which it is secured by means of a nut 52. Each bracket 50 is welded to the wall 44. When the nut 52 is threaded on the end of the hook 48 it will press the flange 40 downwardly against the flange 42 and will likewise maintain a rear, upper flange 54 of the tank 32 against an upper flange portion 56 of the cross member 26 thereby to fixedly secure the tank 32 within the frame assembly 10.

The fuel system 26 further includes a rearwardly located main tank 58 which has an upper portion 60 joined to a lower portion 62 by means of welded, peripheral flanges 64, 66 thereon.

A forward edge 68 of the flanges 64, is supported on a bottom flange 70 of the cross member 24 and a rear upper edge 72 of the joined flanges 64, 66 is located on the underside of a flange 74 on the cross member 16. As in the case of the auxiliary tank 32, the main tank 58 is held in place by a pair of clamp assemblies 76 located on either side of the rear wall 78 of the tank 58 so as to apply an upward tipping movement to the tank 58 so as to locate the edges 68, 72 firmly against the adjacent cross frame members for fixedly securing the tank in place within the assembly 10.

The tank 58 has a side-to-side length so as to locate sidewall portions 75, 77 thereon in close spaced relationship to the side rail members 12, 14. Likewise, the front wall 80 and the rear wall 82 of the tank are closely spaced with respect to the cross frame member 24, 16 thereby to maximize tank fuel capacity included within the confines of assembly 10. In the illustrated arrangement, each of the tanks has a capacity of 25 gallons. They are rectangular in shape having a side-to-side width of approximately 51 inches and a front-to-rear width of approximately 31 inches. The depth of the tanks is slightly over 5½.

By virtue of the aforedescribed tank mount system tanks 32, 58 are fixedly secured to frame assembly 10 to follow movements thereof with respect to a horizontal plane. Accordingly, the tanks will tilt sideways and will tilt in a fore and aft direction depending upon the attitude of the vehicle with respect to a horizontal ground plane.

One feature of the present invention is the provision of a single fuel filler neck 86 connected to a single filler pipe 88 for supplying fuel to both of the tanks 32, 58. The single filler pipe 88 includes first and second branches 90, 92 thereon interconnected by a crossover portion 94 of the filler pipe 88. Each of the branch portions 90, 92 are connected to side openings 96, 98 formed respectively in the sidewall portions 36, 77 of the auxiliary and main tanks. Each of the side openings 96, 98 are located on the horizontal centerline of the tanks so as to locate the lower or bottom edge thereof a fixed distance above the bottoms 100, 102 of the tanks 32, 58.

A fill limiter vent line 104 is connected at the center 106 of the tank 32. It includes an opened end 108 located below the top 29 of the tank. The opened end 108 of line 104 is located in communication with a vapor space 112 located above the maximum fill level 114 in the tank 32. The limiter line 104 connects to a larger diameter fuel limiter line 117 at a tee 122.

A like fuel limiter line 116 is connected to the center 118 of the main tank 58. It also includes an open end 120 located below the upper portion 60. The limiter line 116 thereby has its end 120 in communication with a vapor space 124 formed above the maximum fuel level 126 in the tank 58. The fuel limiter line 116 is also connected to the larger diameter limiter line 117. It in turn communicates with the interior of the filler neck 88. When the tanks 32, 58 have been filled to fuel levels 114, 126 respectively, the bottom open ends of the limiter lines 104, 116 are blocked causing fuel to back up in the filler pipe 88 to indicate that the system is filled. When the vehicle is level, the vent spaces are communicated with atmosphere through the vent lines 204, 206, described later.

The filler neck 86 is located forwardly of the frame assembly 10. This location is approximately at the left front quarter panel of the vehicle chassis. It places the fuel inlet and consequent fumes at a point which is remote from living space in the vehicle. Furthermore, the location is convenient for the driver to communicate with a person filling the tank of the vehicle.

The system further includes a fuel suction line 128 in the rearwardly located main tank 58. It includes an inlet end 130 located within a sump in the bottom 102 of the rear tank 58. A filter 132 covers the inlet end 130 for separating particulate matter from fuel being drawn into the suction line 128. The opposite end of the suction line 128 is connected to a solenoid operated fuel selector valve 134 having an outlet therefrom connected to a fuel supply line 136 that directs fuel from the selector valve 134 to the inlet 138 of a fuel pump 140. The outlet 142 of the pump 140 is connected to a supply line 144 to the inlet 146 of the engine carburetor system 28 for supplying fuel thereto during engine operation.

Fuel is supplied from the auxiliary tank 32 through a suction line 148 having the inlet end 150 thereon located within a sump in the bottom 100 of tank 32. It includes a filter 152 covering the inlet for straining particulate matter from fuel directed into the suction line 148. The opposite end of the suction line 148 is connected to the solenoid operated selector valve 134 which is selectively operated to either connect the suction line 128 or the suction line 148 with the fuel supply line 136.

Both of the fuel tanks 32, 58 include float type sending units 154, 156 respectively therein. The float type sending unit 154 in tank 32 includes a pivotally mounted arm 157 with a float 158 on the opposite end thereof which carries the arm 157 with respect to a housing unit 160 fixedly secured to the suction line 148. Pivotal movement of arm 157 will condition a variable resistance within the housing 160 which varies the resistance for electrical current to flow from the tank unit to a dash-mounted meter for indicating the fuel level in the tank 32. The float type sending unit 156 within the tank 58 includes like operative components.

Referring now to FIG. 3, a control circuit 162 is illustrated including a power source represented by a battery 164 connected through an ignition switch 166 to a fuel supply selector switch 168 including a movable contact 170 positioned between fixed contacts 172, 174. When the selector switch 168 is operated to condition the circuits 162 for withdrawing fuel solely from the main fuel tank 58, the movable contact 170 engages the contact 174 thereby to connect the power source 164 to one end of a coil 176 having the opposite end thereof connected to ground. The coil 176 will condition the selector valve 134 to open communication between the suction line 128 and the fuel supply line 136 and block communication between the suction line 148 and the line 136. When the selector switch 168 is so positioned, it also connects the power source 164 to a conductor 178 for supplying power to the float type sending unit 156 in tank 58. It, in turn, is connected by a condutor 180 to one side of a dash-mounted fuel indicating meter 182 having the opposite side thereof connected to ground.

When the selector switch 168 has the movable contact 170 thereof positioned against contact 172, the coil 176 is no longer energized thereby conditioning the selector valve 134 to block communication between suction line 128 and supply line 136 while intercommunicating suction line 148 therewith. Additionally, the selector switch 168 will connect power source 164 and a conductor 184 to the sending unit 154. It in turn is connected by the conductor 180 to the meter 182 thereby to indicate the level of fuel in the auxiliary tank 32 when the selector switch 168 is in an auxiliary fuel position.

By virtue of the aforesaid arrangement, only a single meter is required to indicate fuel levels in both the main and auxiliary tanks with the fuel level in both of the tanks being selectively scanned by positioning the selector switch 168 in either main or auxiliary positions. The selector switch 168 further serves to condition valve 134 to intercommunicate only one of the suction lines within the main and auxiliary tanks with the fuel pump 140 during different operative phases to retain a predetermined reserve fuel supply in the auxiliary tank 32 in a manner to be discussed.

Another aspect of the present invention is the provision of an improved vent system for the tanks that maintains each of the tanks selectively vented to atmosphere through a system in part including the fuel pipe crossover segment 94.

The fill limiter lines 104 and 106 which connect to line 117 vent the tanks only when filling the tanks through filler neck 86 and pipe 88. During vehicle operation, tipping movement of the tanks 32, 58 either side-to-side or fore and aft can cause fuel to flow through the vent lines 104, 116. Thus, when a cap 184 is installed on the neck 86 vent through lines 104, 106, and 117 is blocked to prevent fuel flow from the tanks. After fill and during vehicle operation, the tank vent function is assumed by vent lines 204 and 206 to be described.

In order to minimize the exhaust of fuel vapors from the tanks, the present invention includes evaporative controls comprising cap 184, a non-vented pressure vacuum relief type, on the single filler neck 86, a liquid vapor separator 186 and a charcoal cannister 188 all operative to direct build-up of vapor pressure within the tanks 32, 58 to the engine carburetor system 28 where the excessive vapors are burned as part of the fuel supply.

The liquid vapor separator 186 includes a hollow rectangular container 190 having four tubes 192, 194, 196, 198 protruding upwardly from the bottom 200 of the container to locate open ends in each of the tubes within an upper vapor space 202.

The rearmost tube 198 connects to one end of a vapor vent line 204 which is connected to the interior of tank 32 through the upper surface of top 29 at a forwardly located, side surface portion thereon. The second tube 196 is connected to a second vent line 206 that vents the rear main tank 58 by being connected through an upper surface portion thereon located rearwardly and to one side of the tank 58 opposite to the side in which the vent line 204 is connected into the tank 32.

The third tube 194 includes a notched bottom opening 208 therein which directs liquid fuel collected in the bottom 200 of the tank, through a liquid return conduit 210 having the opposite end thereof connected at a fitting 212 in the sidewall 77 of the tank 58 adjacent the bottom thereof.

The fourth tube 192 is connected to a vapor transfer line 214 across a small diameter orifice restriction 216 for example, an orifice of 0.055 inches diameter. The transfer line 214 has the opposite end thereof connected to an inlet fitting 218 on the carbon cannister 188. Fuel vapors are given off by the cannister 118 through a fitting 220 connected by means of a line 222 to a fitting 224 in the vehicle carburetor system 28. In some cases, dual series connected cannisters can be located between lines 214, 222 to increase system capacity.

The separator 186 will separate any liquid fuel in the vent lines 204, 206 and return it back to the tanks thereby isolating carbon cannister 188 from liquid in the system. One or the other of the vent lines 204, 206 will always remain open during changes in attitude of the fore and aft arranged tanks 32, 58 thereby defining a continual purge path for flow of vapors from the fuel system into the carbon cannister 188. The crossover 94 will communicate the tank with trapped air with a tank with an open vent and will allow fuel in the air-trapped tank to expand into a vented tank thereby to prevent excessive pressures within the dual tank system.

The reserve fuel supply in the system is produced as follows. First, switch 168 is positioned to energize coil 176 thereby to condition the selector valve 134 to communicate only the rear main tank 58 with the fuel pump 140. During this phase of operation, liquid fuel is drawn through the rear tank suction line 128 and the suction line 148 in the auxiliary tank is blocked. However, by virtue of the single fill pipe 88, both the fuel supply in the rear tank and that in the front tank are available for fueling the vehicle engine 30. More particularly, the crossover segment 94 will balance the liquid levels in both of the tanks and liquid fuel will be equally drawn from both of the tanks through the suction line 128 in the rear main tank until the liquid level in both of the tanks falls below the bottom edge of the side fuel openings 96, 98. At this point, fuel within the auxiliary tank 32 below the bottom edge of the fuel opening 96 therein no longer is in communication with the rear tank. Thus, the suction line 128 only will draw the remaining fuel from the rear tank.

During this phase of operation, the fuel meter 182 which will indicate the level of fuel in both of the tanks, will fall at a reduced rate as long as both of the tanks are in communication with the suction line 128 through the crossover segment 94. However, once the auxiliary tank is no longer in communication with the rear tank through the crossover segment 94, the operator will observe an increased rate of fuel consumption on the meter 182. When the main tank 58 is empty, the vehicle will have a reserve fuel supply remaining in the auxiliary tank 32 that is available when the selector switch 168 is positioned in its auxiliary operation. Then the fuel selector valve 134 will communicate the suction line 148 with the fuel supply line 136. When the reserve fuel supply in the auxiliary tank is used to operate the engine, there is sufficient fuel capacity, approximately 8 gallons, that will enable an operator to drive the vehicle to a filling station.

Another phase of operation is that wherein fuel is supplied to an auxiliary power source from the dual tank system represented by the tanks 32, 58. During this phase of operation, fuel is directed through an auxiliary suction line 226 that is connected to a fitting 228 off of the filler pipe crossover 94. When the vehicle is parked and the auxiliary power is on, fuel will be withdrawn from the suction line 226 and through the crossover segment 94 and each of the side openings 90, 92 until fuel in both of the tanks 32, 58 falls below the level represented by the bottom edge of the side openings 96, 98. At this point, auxiliary power operation will terminate. However, there will be a substantial reserve of fuel remaining in the tanks 32, 58 that can be used to operate the vehicle engine 30. In this case, the crossover segment 94 serves to automatically retain fuel reserves both in the auxiliary and main tanks. Alternatively, as in the case of normal vehicle operation, the auxiliary power suction line can connect directly into the main tank 58. In this case, the crossover tube functions to retain only a reserve fuel supply in the forwardly located auxiliary tank 32.

The restrictor 216 at the outlet of the liquid vapor separator 186 to the carbon cannister 188 will cause a majority of the fuel vapors in the fuel tanks to be contained and condensed therein. The vented fuel vapors are absorbed by the charcoal until the saturation point is reached. Raw fuel and additional vapors are then discharged to atmosphere through a hole 230 in the bottom of cannister 188; however, the capacity of the charcoal cannister is such that there is sufficient capacity to take care of most of the vapor. The cannister is purged of absorbed vapor whenever the engine is operating by drawing air through hole 230, directing it upwardly through the cannister 188 thence through fitting 220, line 222 and fitting 224 to carburetor 28.

While the embodiments of the present invention, as herein disclosed, constitute a preferred form, it is to be understood that other forms might be adopted.

What is claimed is as follows:

1. A vehicle fuel supply system comprising: separate first and second tanks each having a bottom and side walls, a fuel opening in one side wall of each tank, a single fuel filler neck for receiving fuel to be supplied to the said first and second tanks, a fuel filler pipe connected to said neck having first and second branches thereon connected by a crossover segment, said branches connected to said fuel openings in said first and second tanks for filling said tanks concurrently from said single fuel filler neck, first and second fuel suction lines located respectively within said first and second tanks each of said suction lines having an inlet opening at the tank bottom for directing fuel therefrom, a fuel pump for supplying fuel to a vehicle carburetor system including an inlet and an outlet, control means for selectively communicating one of said first and second suction lines in one of the tanks to said pump during a first pump-down phase, said crossover segment directing fuel from the other of the tanks to the one tank during the first pump-down phase whereby fuel level in each of said first and second tanks is lowered equally until the fuel level in said first and second tanks is lower than the bottom edge of said fuel openings, said crossover segment serving to disconnect the one tank from the other tank when the fuel level reaches a minimum level during the pump-down phase to retain a reserve of fuel in the other tank, said control means being operable to communicate the other tank to supply the reserve fuel to said pump during a second pump-down phase.

2. A vehicle fuel supply system comprising: separate first and second fuel tanks each having flat bottoms and a sidewall portion thereon with a fuel opening located on the horizontal center line of said sidewall to have a bottom edge located above the tank bottom, a single fuel filler neck for receiving fuel to be supplied to the said first and second tanks, a fuel filler pipe connected to said neck having first and second branches connected respectively to said fuel openings, a crossover segment between said branches, said crossover segment and said branches being located in a common plane including said fuel openings in said first and second tanks for filling said tanks concurrently from said single fuel filler neck, first and second fuel suction lines located respectively within said first and second tanks for directing fuel therefrom, a fuel selector valve having inlets connected to each of said lines and having an outlet, a fuel pump for supplying fuel to a vehicle carburetor system including an inlet and an outlet, a primary fuel suction line connecting said pump inlet to the outlet of said selector valve, means for conditioning said selector valve to communicate one of said first and second suction lines in one of the tanks to said pump during a first pump-down phase, said crossover segment directing fuel from the other tank to the one tank during the first pump-down phase whereby fuel level in each of said first and second tanks is lowered equally until the fuel level in said first and second tanks is lower than the bottom edge of said side openings, said crossover segment serving to disconnect the one tank from the other tank when the fuel level reaches a minimum level during the pump-down phase to retain a reserve of fuel in the other tank equal to the fuel volume between the tank bottom and the bottom edge of said side fuel opening in the other tank, said control means being operable to condition said selector valve to communicate the other tank to supply the reserve fuel to said pump during a second pump-down phase.

3. A vehicle fuel supply system comprising an auxiliary fuel tank and a separate main fuel tank, each of said tanks having a fuel fill opening therein with the bottom edge of said fuel fill opening at a point above the tank bottom, a single fuel filler neck for receiving fuel to be supplied to said first and second tanks, a fuel filler pipe connected to said neck having first and second branches thereon connected by a crossover segment, said pipe, branches and crossover segment being external of said tanks, each of said branches connecting said filler pipe to one of said tank fuel fill openings, first and second suction lines located respectively in said auxiliary and main fuel tanks, fuel pump means for supplying fuel to a vehicle carburetor system, control means for selectively communicating one or the other of said suction lines of said pump means for withdrawing fuel from said tanks, said crossover segment serving to intercommunicate said tanks during a first pump-down phase whereby fuel will be drawn equally from each of said tanks until the level in the auxiliary tank reaches a minimum point at the bottom edge of one of said fill openings, means including an auxiliary power fuel suction line in communication with said main fuel tank for supplying fuel to auxiliary power systems on a vehicle, said auxiliary power fuel suction line drawing fuel from said main tank during auxiliary power operation, said crossover segment communicating said main tank with auxiliary tank during auxiliary power operation to cause fuel to be drawn equally from said tanks until the level of fuel in said tanks reaches the minimum level at the bottom edge of said one fill opening with a reserve fuel supply being retained in said auxiliary tank equal to the fuel volume between the bottom of said auxiliary tank and the bottom edge of the one fill opening therein, said control means connecting the suction line in said auxiliary tank to the fuel pump during a second pump-down phase wherein the reserve fuel in the auxiliary tank is available for operating the vehicle.

4. A vehicle fuel system comprising a pair of rectangular front and rear tanks located adjacent one another, a vehicle frame surrounding said tanks, one of said tanks being located forwardly of the other of said tanks within said frame, each of said tanks having a side fuel opening therein, a single fuel filler neck and fill pipe for said tanks including portions thereon connected to said tanks at the side openings therein, a fuel limiter line connected to the center of each of said tanks having an opened end located within said tank, each of the said tanks having an upper surface located above the opened end of said fuel limiter line to define a vapor expansion space in each of said tanks, a line connected to each of said fill limiter lines having an opened end thereon connected to said fuel filler neck, a liquid vapor separator including a container and four tubes located therein each having an upper open end at the top of the container and each protruding from the container exteriorly of the bottom thereof, first vent means for connecting one of said tubes to the forward side of the upper surface of the front tank, second vent means for connecting a second tube within said liquid vapor separator container to a rearwardly located portion of the top surface of said rear tank on the opposite side from the vent connection to the front tank, a vapor transfer line, means for connecting a third one of said tubes to said vapor transfer line, return means for connecting a fourth one of said tubes to the rear tank, said fourth tube having a notch therein at its base to drain liquid fuel from the bottom of said container to said return means, a restrictor in said vapor transfer line for restricting flow of fuel vapors from said container to maintain the majority of fuel vapors in said system within said front and rear fuel tanks, said first vent means being exposed to communicate the pair of tanks with atmosphere when the forward tank is tilted upwardly and the rearward tank is depressed, said second vent means being exposed to communicate both tanks with atmosphere when the forward tank is depressed and the rear tank is tilted upwardly, said single fill pipe serving to equalize pressure between said tanks from an exposed vent means in one of the tanks to a blocked vent means in the other of the tanks as produced by fore and aft tilting movements of said pair of tanks and said single fill pipe intercommunicating each of said tanks so that expansion of fuel in a tank tilted to have trapped air therein will expand through said single filler line and be directed into a tank with an open vent means.

5. A vehicle fuel supply system comprising: first and second fuel tanks each having a bottom and a fuel opening in the side thereof with its bottom edge above said tank bottom, a single fuel filler neck for receiving fuel to be supplied to the said first and second tanks, a fuel filler pipe connected to said neck having first and second branches thereon connected by a crossover segment, said branches connected to said fuel openings in said first and second tanks for filling said tanks concurrently from said single fuel filler neck, first and second fuel suction lines located respectively within said first and second tanks, each of said suction lines having an inlet opening at the tank bottom for directing fuel therefrom, a fuel pump for supplying fuel to a vehicle carburetor system including an inlet and an outlet, control means for selectively communicating one of said first and second suction lines in one of the tanks to said pump during a first pump-down phase, said crossover segment directing fuel from the other of the tanks to the one tank during the first pump-down phase whereby fuel level in each of said first and second tanks is lowered equally until the level of fuel in said first and second tanks is lower than the bottom edge of said fuel openings at which time said crossover segment disconnects the one tank from the other tank to retain a reserve of fuel in the other tank, said control means being operable to communicate the other tank to supply the reserve fuel to said pump during a second pump-down phase, said first tank being located forwardly at said second tank, a liquid vapor separator including a container and four tubes located therein each having an upper end at the top of the container and each protruding from the container exteriorly of the bottom thereof, first vent means for connecting one of said tubes to the forward side of the upper surface of said first tank, second vent means for connecting a second tube within said liquid vapor separator container to a rearwardly located portion of the top surface of said second tank on the opposite side from the vent connection to said first tank, a vapor transfer line, means for connecting a third one of said tubes to said vapor transfer line, return means for connecting a fourth one of said tubes to a liquid fuel return line to said second tank, said fourth tube being notched at its base to drain liquid fuel into said return means, said first vent means being operative to communicate said first and second tanks with atmosphere when said first tank is tilted upwardly and said second tank is depressed, said second vent means serving to communicate both tanks with atmosphere when said first tank is depressed and said second tank is tilted upwardly.

\* \* \* \* \*